(12) United States Patent
Kim et al.

(10) Patent No.: US 12,218,377 B2
(45) Date of Patent: Feb. 4, 2025

(54) GAS VENTING DEVICE AND BATTERY PACK COMPRISING SAME

(71) Applicant: LG ENERGY SOLUTION, LTD., Seoul (KR)

(72) Inventors: Doo Seung Kim, Daejeon (KR); Il Suk Sim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 665 days.

(21) Appl. No.: 17/432,980

(22) PCT Filed: Jan. 12, 2021

(86) PCT No.: PCT/KR2021/000398
§ 371 (c)(1),
(2) Date: Aug. 23, 2021

(87) PCT Pub. No.: WO2021/145646
PCT Pub. Date: Jul. 22, 2021

(65) Prior Publication Data
US 2022/0166104 A1 May 26, 2022

(30) Foreign Application Priority Data
Jan. 14, 2020 (KR) .................. 10-2020-0004772

(51) Int. Cl.
*H01M 50/35* (2021.01)
*F16K 17/16* (2006.01)
(Continued)

(52) U.S. Cl.
CPC ............. *H01M 50/35* (2021.01); *F16K 17/16* (2013.01); *F16K 24/04* (2013.01); *F16K 27/00* (2013.01);
(Continued)

(58) Field of Classification Search
CPC ............... H01M 50/35; H01M 50/184; H01M 2220/20; H01M 50/3425; H01M 50/183;
(Continued)

(56) References Cited

U.S. PATENT DOCUMENTS

2010/0032039 A1    2/2010  Nemoto et al.
2012/0021262 A1*   1/2012  Kusama ............ H01M 50/3425
                                              429/56

(Continued)

FOREIGN PATENT DOCUMENTS

CN          201160093 Y       12/2008
DE    10 2013 210 335 A1      12/2014
(Continued)

OTHER PUBLICATIONS

Air nozzle outlet profile efficiency, concave/convex (Year: 2015).*
(Continued)

*Primary Examiner* — James M Erwin
*Assistant Examiner* — Kevin Nguyen
(74) *Attorney, Agent, or Firm* — Birch, Stewart, Kolasch & Birch, LLP

(57) ABSTRACT

A gas venting device, and a battery module and a battery pack comprising same has a gradually reducing the cross-sectional area of a flow path in a gas discharge direction to create so that a greater flow rate of gas can be discharged even when a venting disc having the same area is used.

8 Claims, 6 Drawing Sheets

(51) Int. Cl.
*F16K 24/04* (2006.01)
*F16K 27/00* (2006.01)
*H01M 50/184* (2021.01)
*H01M 50/342* (2021.01)

(52) U.S. Cl.
CPC ..... *H01M 50/184* (2021.01); *H01M 50/3425* (2021.01); *H01M 2220/20* (2013.01)

(58) Field of Classification Search
CPC ... H01M 2200/20; H01M 50/20; F16K 24/04; F16K 17/16; F16K 27/00; Y02E 60/10
USPC ........................................................ 429/53
See application file for complete search history.

(56) References Cited

U.S. PATENT DOCUMENTS

| | | |
|---|---|---|
| 2013/0074957 A1 | 3/2013 | Cho et al. |
| 2014/0227565 A1 | 8/2014 | Wan et al. |
| 2015/0072184 A1 | 3/2015 | Kusunoki et al. |
| 2017/0279098 A1* | 9/2017 | Lee ................... H01M 50/3425 |
| 2020/0303701 A1 | 9/2020 | Kim et al. |

FOREIGN PATENT DOCUMENTS

| | | | |
|---|---|---|---|
| JP | 2013-89375 A | | 5/2013 |
| JP | 2013114991 A | * | 6/2013 |
| JP | 2018-77932 A | | 5/2018 |
| KR | 10-2005-0007921 A | | 1/2005 |
| KR | 10-2011-0118715 A | | 10/2011 |
| KR | 10-2013-0033864 A | | 4/2013 |
| KR | 10-2014-0109370 A | | 9/2014 |
| KR | 10-2015-0030600 A | | 3/2015 |
| KR | 10-2016-0112768 A | | 9/2016 |
| KR | 20160112768 A | * | 9/2016 |
| KR | 10-2018-0039986 A | | 4/2018 |
| KR | 10-2018-0091301 A | | 8/2018 |
| KR | 10-2019-0069131 A | | 6/2019 |

OTHER PUBLICATIONS

International Search Report (PCT/ISA/210) issued in PCT/KR2021/000398, dated Apr. 29, 2021.

Extended European Search Report for European Application No. 21741090.1, dated Apr. 20, 2022.

* cited by examiner

[FIG. 1]
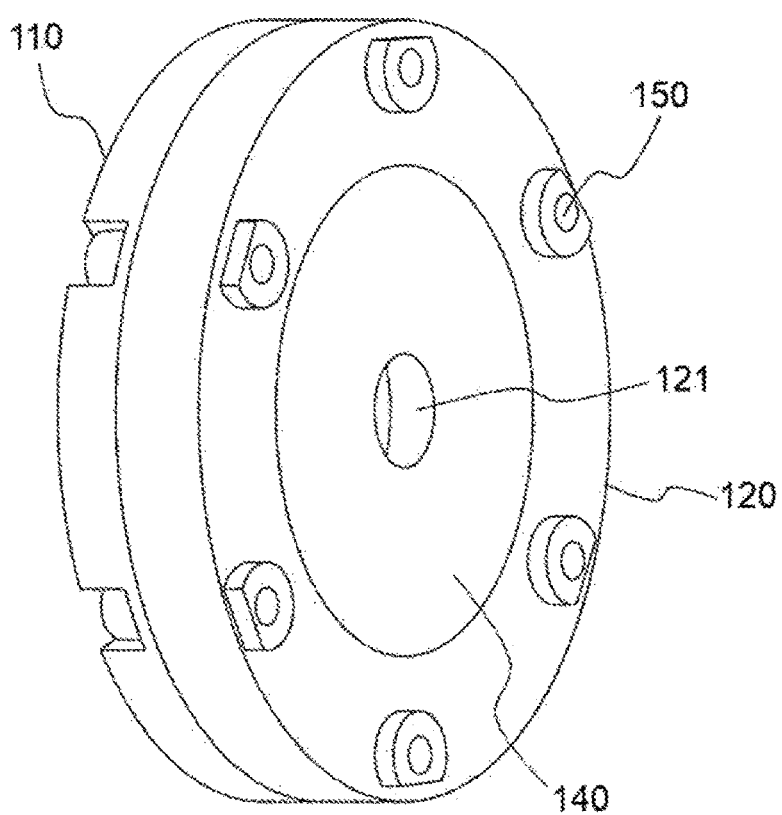

[FIG. 2]
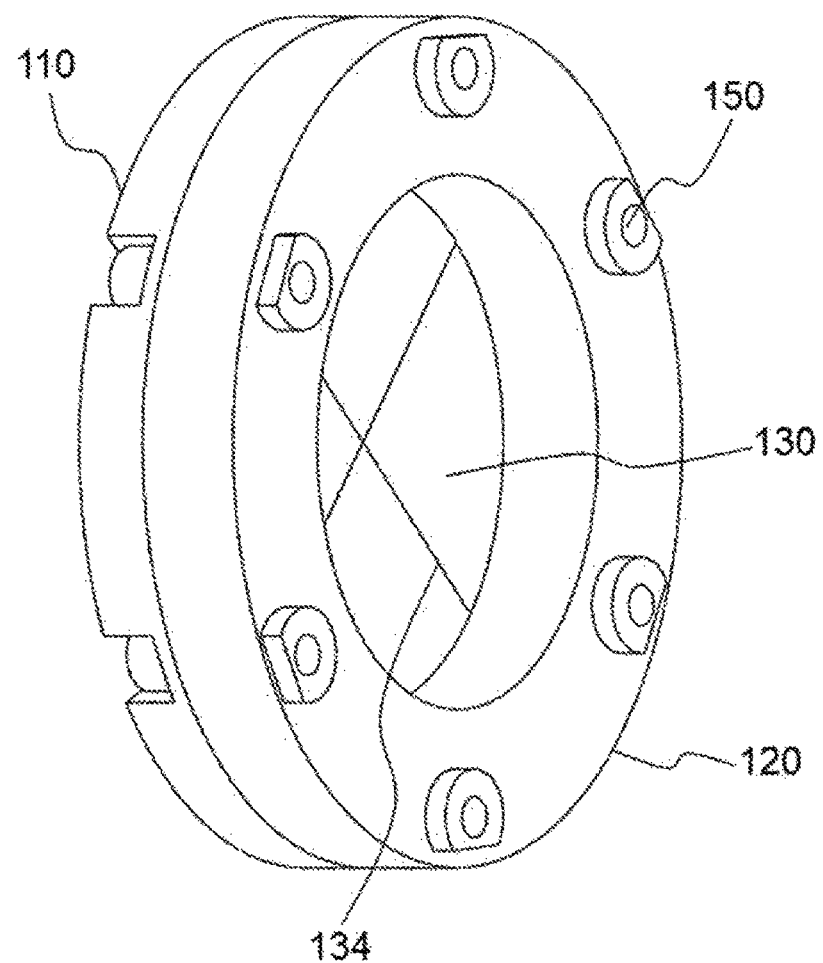

[FIG. 3]
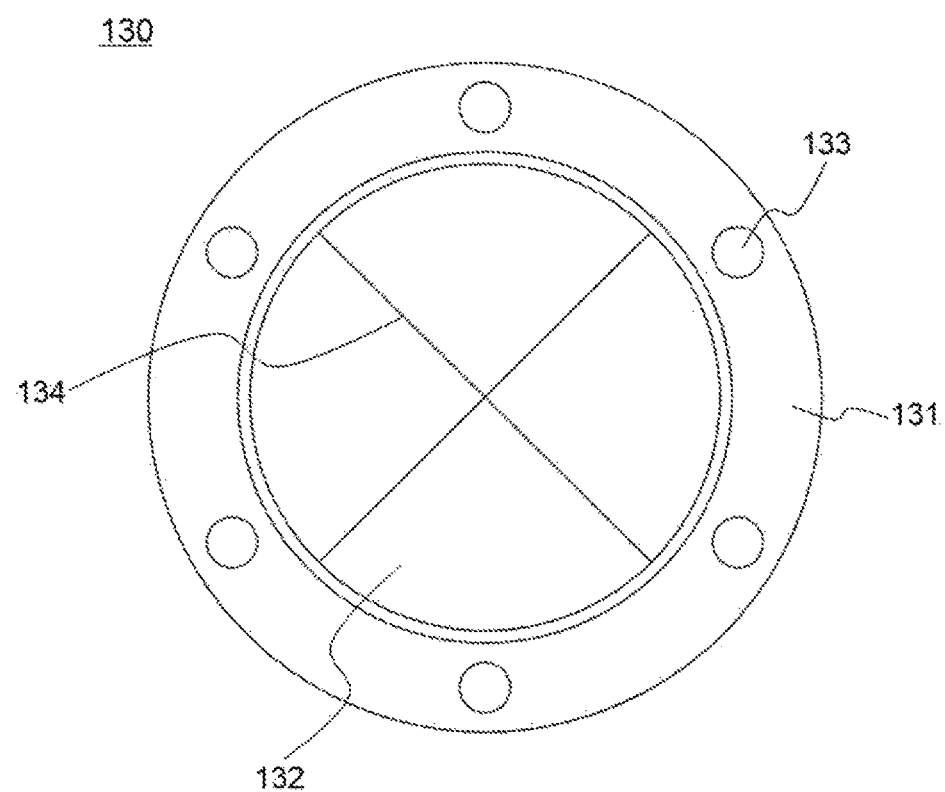

[FIG. 4]
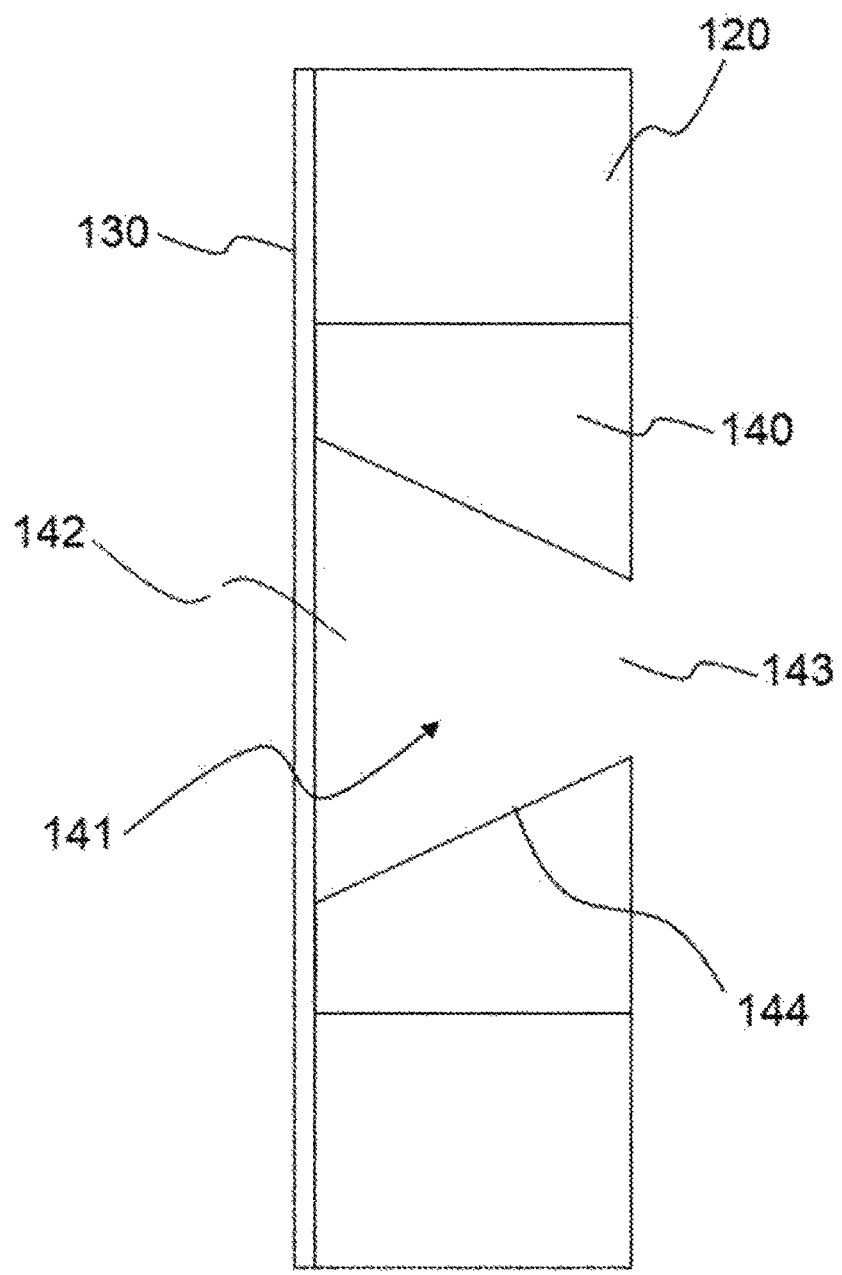

[FIG. 5]
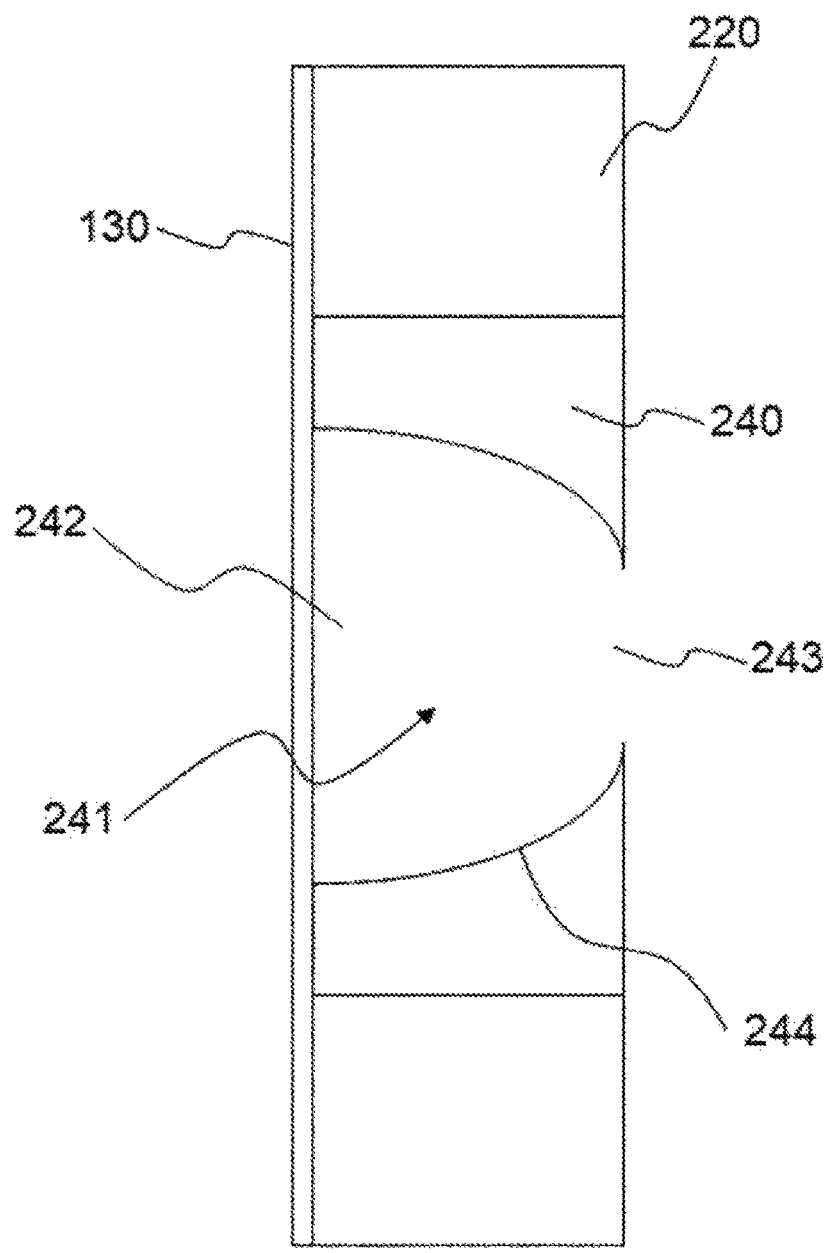

[FIG. 6]
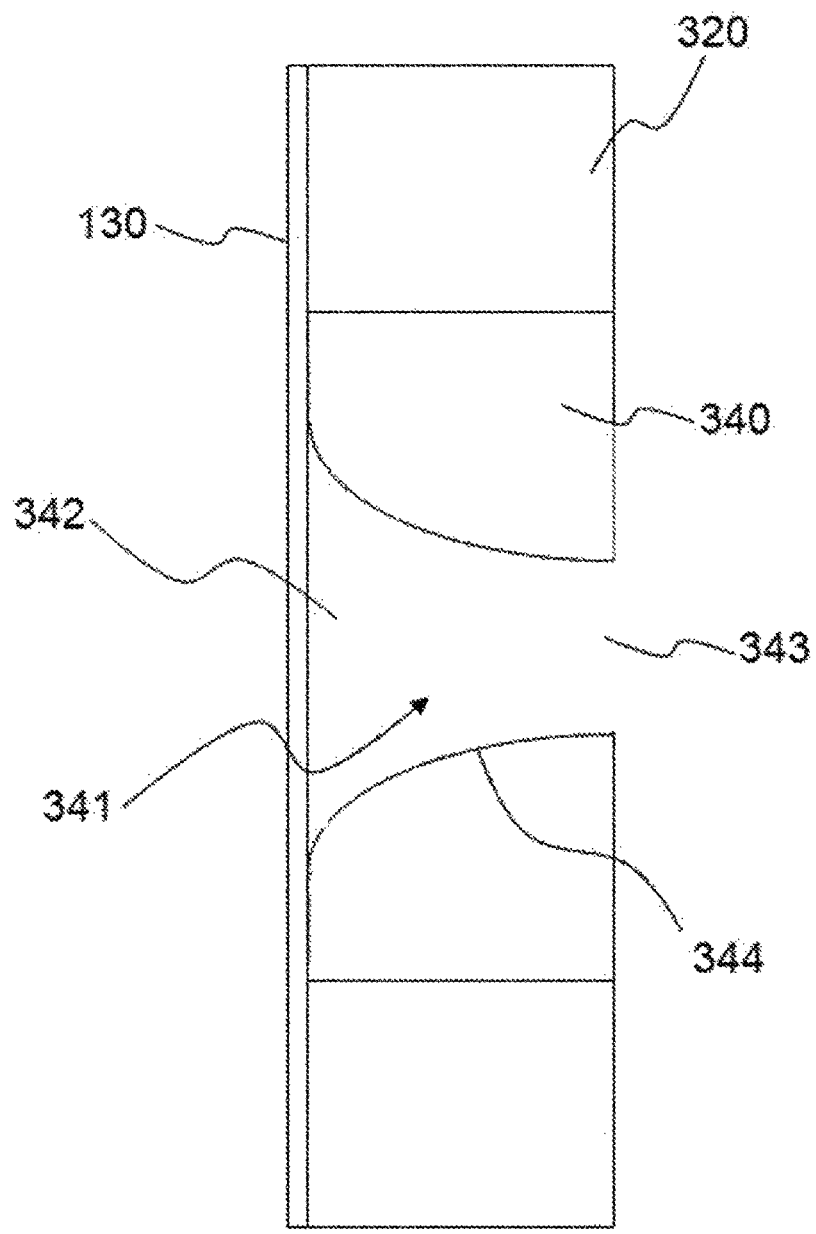

GAS VENTING DEVICE AND BATTERY PACK COMPRISING SAME

TECHNICAL FIELD

This application claims the benefit of priority based on Korean Patent Application No. 10-2020-0004772, filed on Jan. 14, 2020, and the entire contents of the Korean patent application are incorporated herein by reference.

The present invention relates to a gas venting device, a battery module and a battery pack including the gas venting device, and a vehicle.

BACKGROUND ART

The battery pack applied to an electric vehicle or the like has a structure in which a plurality of cell modules including a plurality of secondary batteries are connected in series or parallel to obtain high output. The secondary battery can be repeatedly charged and discharged by the electrochemical reaction between components including positive electrode and negative electrode current collectors, a separator, an active material, an electrolyte solution, and the like.

In the secondary battery, as the charge/discharge is repeated, gas may be generated from the inside any time during use, which is called venting gas. For example, when an overcurrent flows, the temperature of the internal secondary battery rises rapidly. The rapid rise in such a temperature may cause a decomposition reaction of an electrolyte solution to generate gas. When gas is generated from the secondary battery inside the battery pack, such gas may be collected inside the pack, thereby exploding the battery pack, or flowing into a vehicle, etc. through a cooling duct, etc. of the battery pack. As such, a venting device for reducing the internal pressure by discharging inner gas to the outside is prepared in the battery pack.

A venting disk, which may be broken according to the internal pressure between the inlet where gas inside the battery pack flows in and the outlet where gas is discharged, is generally inserted into the venting device. However, since the existing venting device has a cylindrical structure where the inlet portion and the outlet portion of the gas are simply connected, the pressure between the inlet and the outlet is not large, and thus there is a limit in the flow rate of dischargeable gas.

DISCLOSURE

Technical Problem

The present invention has been created to solve the above problems, and an object of the present invention is to provide a gas venting device capable of discharging gas at a higher flow rate with the venting disk of the same area, and a battery module and a battery pack including the same.

Technical Solution

A gas venting device for a battery module or a battery pack according to the present invention includes: an inner bracket including a first through hole in a central portion through which gas in a battery module or a battery pack flows in, an outer bracket including a second through hole in a central portion connected to the first through hole of the inner bracket and including a flow path through which inflowing gas is discharged to an outside; and a venting disk configured to shield the first through hole and the second through hole by allowing the inner bracket to be coupled to the outer bracket and to be broken when a predetermined pressure is applied, wherein a cross-sectional area of a flow path formed at the outer bracket continuously or sequentially is configured to decrease from an inlet portion of the flow path to an outlet portion of the flow path in a gas discharge direction.

In a specific example, a discharge guide member including the flow path formed in the second through hole of the outer bracket, the discharge guide member being connected to the second through hole.

In one example, the flow path formed on the discharge guide member has a truncated cone shape.

In another example, the flow path formed by the discharge guide member has a truncated cone shape in which the cross-sectional area of the flow path continuously decreases toward the outlet portion, an inclined surface formed on an inner wall of the flow path is concavely bent.

In another example, the flow path formed by the discharge guide member has a truncated cone shape in which the cross-sectional area of the flow path continuously decreases toward the outlet portion, an inclined surface formed on an inner wall of the flow path is convexedly bent.

In one specific example, the cross-sectional area of the inlet portion corresponds to the cross-sectional area of the first through hole formed on the inner bracket.

In another specific example, the cross-sectional area of the outlet portion corresponds to 40 to 80% of the cross-sectional area of the inlet portion.

In one example, a protrusion having a pattern of a screw thread, an embossing, or a straight line is formed at an inner wall of the flow path.

In a specific example, the venting disk includes: a disk outer periphery configured to be coupled to the inner bracket and the outer bracket; and a disk inner periphery configured to be formed as one body with the disk outer periphery and shield the through hole, and be broken when a predetermined pressure is applied.

In a specific example, the disk inner periphery is made of a metal or plastic material which is breakable when a predetermined pressure is applied.

In a specific example, a notch is formed on the disk inner periphery to be broken when the predetermined pressure is applied.

In one example, a disk pad is interposed between the outer bracket and the venting disk or between the inner bracket and the venting disk.

The present invention provides a battery module including the above-described gas venting device, and the battery module includes: a plurality of secondary batteries; and a module frame having the secondary battery mounted thereon, wherein the gas venting device is formed at one side of the module frame.

In a specific example, the battery module further includes a sealing member configured to seal a part between the module frame and the outer periphery of the gas venting device.

Further, the present invention provides a battery pack including the above-described gas venting device, and the battery pack includes: a battery module configured to include a plurality of secondary batteries; and a battery pack case configured to include a tray having the battery module mounted thereon and a pack cover for covering the battery module, wherein the gas venting device formed at one side of the battery pack case.

At this time, in the battery pack, the battery module may be a battery module in which the gas venting device is formed at one side of the module frame as described above.

In one example, the battery pack further includes a sealing member configured to seal a part between the battery pack case and the outer periphery of the gas venting device.

Further, the present invention provides a vehicle including the battery pack.

Advantageous Effects

According to a gas venting device and a battery module and a battery pack including the same according to the present invention, the safety of the battery module and the battery pack can be improved by discharging gas at a higher flow rate even when using the venting disk of the same area.

BRIEF DESCRIPTION OF THE DRAWINGS

FIG. 1 is a perspective view of a gas venting device according to an embodiment of the present invention.

FIG. 2 is a perspective view showing a coupled form of a bracket and a venting disk in a gas venting device according to an embodiment of the present invention.

FIG. 3 is a schematic diagram showing the shape of a venting disk according to an embodiment of the present invention.

FIG. 4 is a schematic diagram illustrating a cross section of a venting disk and an outer bracket according to an embodiment of the present invention.

FIG. 5 is a schematic diagram illustrating a cross section of a venting disk and an outer bracket according to another embodiment of the present invention.

FIG. 6 is a schematic diagram illustrating a cross section of a venting disk and an outer bracket according to further another embodiment of the present invention.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

A gas venting device for a battery pack according to the present invention includes: an inner bracket configured to have a structure to be used as a flow path, through which gas in a battery pack flows in, by having a through hole in a central portion; an outer bracket configured to have a through hole connected to the through hole of the inner bracket and have a flow path through which inflowing gas is discharged to an outside; and a venting disk configured to shield a through hole by allowing the inner bracket to be coupled to the outer bracket and to be broken when a predetermined pressure is applied, wherein a cross-sectional area of a flow path formed at the outer bracket continuously or sequentially is configured to decrease in a gas discharge direction. At this time, the inner side means a direction in which gas flows in from the inside of the battery module or the battery pack, and the outer side means a direction in which gas flows out to the outside.

Generally, a plurality of cell modules are mounted on a battery pack, and a plurality of secondary batteries are built into each battery module. These secondary batteries generate gas due to the decomposition, etc. reaction of the electrolyte solution as the charge/discharge is repeated. The heat generated during the charge/discharge process of the battery promotes the generation of the gas, and the gas is expanded to increase the pressure inside the battery module or the battery pack. When such a process is continued, the battery module or the battery pack may explode, or the internal gas may flow into the vehicle, etc. through a duct, etc. Hence, when the pressure of the gas becomes or more than a predetermined size, the venting device for discharging gas is attached as the venting disk is broken.

Such gases are generally compressible fluids of which the volume to the pressure changes. When the air flows at a high speed, some regions have a high pressure and density, and the volume of air is reduced. However, in the emission process of the gas in the above gas, the emission rate of the gas is small, which shows uncompressed flow phenomena that can ignore the volume change according to pressure. In this uncompressed flow, the voltage force is constant on the fluid, and the pressure and velocity of the fluid becomes inversely proportional. That is, when the pressure of the fluid increases, the flow rate decreases and the flow rate increases when the pressure of the fluid is reduced.

Further, in the case that the cross-sectional area of the flow path gradually decreases in the gas discharge direction, the internal pressure increases in the inlet portion having a large cross-sectional area as the speed of the air decreases, and the internal pressure decreases in the outlet portion having a small cross-sectional area as the speed of the air increases. As a result, the pressure difference between the inlet and the outlet is locally further increased, and even if a venting disk having the same area is used, it is possible to emit gases of a larger flow rate. Therefore, when the internal pressure due to the gas generated in the battery pack exceeds the reference value, the gas is quickly discharged, and the safety of the battery module and the battery pack can be improved.

In one example, a discharge guide member having a gas discharge flow path is formed in through hole formed in a central portion of the outer bracket, the discharge guide member being connected to the through hole, and a cross-sectional area of the gas discharge flow path continuously or sequentially is configured to decrease from an inlet portion of the flow path to an outlet portion of the flow path. The discharge guide member has a removable or replacement structure. In the present invention, by inserting a separate guide member for determining the shape of the flow path into an outer bracket, the discharge of gas becomes smooth, components can be easily replaced, and the shape of the flow path can be easily changed. In this case, the gas discharge flow path formed in the discharge guide member serves as a flow path, through which the gas is discharged to the outside, as a through hole formed in the outer bracket.

In one example, the gas discharge flow path formed on the discharge guide member has a truncated cone shape. Specifically, the shapes of the inlet portion and the outlet portion are circular in the discharge guide member, which form the bottom surface and the top surface of the truncated cone shape, respectively. The inclined surface is formed at the inner wall of the flow path as the cross-sectional area gradually decreases in a direction from the inlet portion toward the outlet portion. At this time, the decrease rate of the cross-sectional area is constant in the entire flow path.

The decrease rate of the cross-sectional area may have a shape that changes throughout the flow path. In another example, the gas discharge flow path formed on the discharge guide member has a truncated cone shape in which as a cross-sectional area of the gas discharge flow path continuously decreases toward the outlet portion, an inclined surface formed on an inner wall of the flow path is concavely bent. Herein, the shape, in which the inclined surface is concavely bent, means a shape, in which the inclined surface is recessed toward the outside of the flow path, on the vertical cross-section of the flow path. In this case, the decrease rate of the cross-sectional area is small in a region near the inlet portion at which gas flows in, and the decrease rate increases toward the outlet portion at which gas is discharged.

In another example, the gas discharge flow path formed on the discharge guide member has a truncated cone shape in which as a cross-sectional area of the gas discharge flow path continuously decreases toward the outlet portion, an inclined surface formed on an inner wall of the flow path is convexedly bent. Herein, the shape, in which the inclined surface is convexedly bent, means a shape, in which the inclined surface is protruded toward the center of the flow path, on the vertical cross-section of the flow path. In this case, the decrease rate of the cross-sectional area is large in a region near the inlet portion at which gas flows in, and the decrease rate increases toward the outlet portion at which gas is discharged. In the discharge guide member, the shape of the flow path formed therein is designed in various forms depending on the safety reference, etc. of the battery pack.

In a specific example, the cross-sectional area of the inlet portion corresponds to the cross-sectional area of a through hole formed in the inner bracket. As such, it is possible to prevent a change in pressure or flow rate of gas generated inside the battery pack before entering the flow path formed in the discharge guide member. For example, when the cross-sectional area of the inlet portion is greater than the cross-sectional area of the through hole formed at the inner bracket, gas gradually passes the inner bracket of the flow path and the inlet portion, and the cross-sectional area of the flow path increases along the flowing direction of the gas, and this may reduce the flow rate of the gas during the discharge of the gas, which may decrease the effects of the present invention.

Further, the cross-sectional area of the outlet portion may be appropriately selected according to the structure or the safety conditions of the battery module and the battery pack, but may be 40% to 80% of the cross-sectional area of the inlet portion. In particular, the cross-sectional area of the outlet portion is 50 to 70% of the cross-sectional area of the inlet portion, and may more particularly be 55 to 65%. If the cross-sectional area of the outlet portion is less than 40% of the cross-sectional area of the inlet portion, the outlet portion becomes too narrow. On the other hand, when the cross-sectional area of the outlet portion exceeds 80% of the cross-sectional area of the inlet portion, the difference between the cross-sectional areas of the inlet portion and the outlet portion excessively decrease, so that as the difference in the pressures at the inlet portion and the outlet portion decrease, the efficiency of the gas venting decreases.

In one specific example, a pattern for assisting gas emission may be formed on the inner wall of the flow path. For example, the pattern may be a protrusion shape having a straight line pattern parallel to a thread, embossing or a gas discharge direction. Specifically, the pattern may be in the form of an embossing or thread protrusion which covers the inside of the flow path along the inner wall of the flow path. This pattern can promote the emission of gas.

Further, in the gas venting device for the battery module and the battery pack according to the present invention, the venting disk includes: a disk outer periphery configured to be coupled to the inner bracket and the outer bracket; and a disk inner periphery configured to be formed as one body with the disk outer periphery and shield the through hole, and be broken when a predetermined pressure is applied.

The disk outer periphery is a part for fixing the bracket and the venting disk. One surface of the disk outer periphery is in contact with the inner bracket, and the other surface of the disk outer periphery is in contact with the outer bracket. The disk outer periphery may further include a fastening hole along the circumferential direction, and the inner bracket, the disk outer periphery and the outer bracket may be integrally coupled through a bolt fastening scheme.

The inner periphery of the disc is made of a metal or plastic material which may be broken when a predetermined pressure is applied. For example, the inner periphery of the disc may be formed of a metal of a copper, aluminum or stainless steel, or a plastic material. The inner periphery of the disc can be appropriately selected according to the pressure condition when broken and is not limited to the scope of the present invention.

The disk inner periphery prevents moisture or foreign materials from being flown into the battery pack by blocking the through hole of the inner bracket in normal conditions. However, when a large amount of gas is generated in the battery pack, the pressure in the battery pack is raised and the pressure acts to break the inner periphery of the disk. At this time, since the pressure at the inside of the battery module or the battery pack is higher than that of the outside, the internal gas may be discharged to the outside of the battery module or the battery pack.

A notch is formed so that the inner periphery of the disk may be broken when a predetermined pressure is applied to the inner periphery of the disc. Such a notch is partially cut in a thickness direction from the surface of the disk. The notch may be designed in a cross, circular rectangle, U or elliptical shape, and the cross-section of the notch may have a trapezoidal, V or square shape, etc. The shape of the notch formed in the inner periphery of the disc is not necessarily limited thereto and may have various shapes.

In one specific example, a disk pad is interposed between the outer bracket and the venting disk or between the inner bracket and the venting disk. Such a disk pad may be provided in an annular shape or a ring shape in a form corresponding to a disk outer periphery. The disk pad is intended to increase the airtightness between the outer bracket and the venting disk and between the inner bracket and the venting disk, and to prevent breakage of the disk outer periphery. For example, the disk pad may be formed of an elastic rubber material or the like.

Further, the present invention provides a battery module including a gas venting device described above. The battery module according to the present invention includes: a plurality of secondary batteries; and a module frame having the secondary battery mounted thereon, in which the gas venting device is formed at one side of the module frame.

Specifically, the secondary battery has a form in which an electrode assembly, which is generated by alternately stacking a positive electrode, a negative electrode and a separator, is mounted in a cell case together with electrolyte solution. The configuration of such a secondary battery is obvious to a person skilled in the art to which the present invention pertains, and thus a more detailed description thereof will be omitted. Further, the scheme, in which the module frame of the battery module is coupled with the gas venting device, may be the same as the scheme, in which the battery pack is coupled with the gas venting device, to be described later.

Further, the battery module may further include a sealing member configured to seal a part between the module frame and the outer periphery of the gas venting device. The sealing member may be a rubber ring or a silicone resin and may seal the battery module by being installed at a gap between the gas venting device and the module frame.

Further, the present invention provides a battery pack including a gas venting device described above.

In one example, the battery pack according to the present invention includes: a battery module configured to include a plurality of secondary batteries; and a battery pack case configured to include a tray having the battery module mounted thereon and a pack cover for covering the battery module, in which the above-described gas venting device is formed at one side of the battery pack case.

First, the battery module includes a multiple of secondary batteries and a module frame accommodating them, and an electrical device mounted around the module. In particular, the battery cell may be a pouch-type battery cell and has a structure having an electrode assembly, an electrolyte solution, and a pouch case. The configuration of such a battery cell is obvious to a person skilled in the art to which the present invention pertains, and thus a more detailed description thereof will be omitted. In addition, various secondary batteries known at the time of filing the present invention may be employed in the battery pack according to the present invention. Further, the electrical device includes a battery management system (BMS) that monitors and controls the operation of a battery module, a battery disconnection unit (BDU) that controls electrical connections of the battery module, a fuse that is located between the battery module and the BMS and provides a function of blocking overcurrent, etc.

The battery pack case includes a tray where a battery module is mounted at a lower side, and a pack cover covering the side and top of the battery module, and the tray and the pack cover may be coupled in a bolt fastening manner.

A hole for serving as a gas discharge port may be formed at one side of the battery pack case, and the above-described gas venting device for the battery pack may be coupled with the hole. Since the density of the internal gas of the battery pack, which is generated in the secondary battery, etc., is generally greater than that of air, the gas discharge port is preferably positioned at the lower portion of the battery pack in the gas discharge aspect. However, the position of such a gas discharge port may be changed according to the structure to which the battery pack is applied, or characteristics.

Specifically, the gas venting device for the battery pack may be inserted into a hole formed in the battery pack case and is fixed in a state that all of the inner bracket, the venting disk and the outer bracket are coupled. To this end, in the gas venting device, a separate bolt through hole for the coupling with the battery pack may be formed at the outer circumference portions of one or more of the inner bracket and the outer bracket, and a bolt through hole may also be formed at a position corresponding to the battery pack case. Particularly, the outer circumference portion of the outer bracket may extend more than the inner bracket, and the bolt through hole may be formed in the extended portion. In this case, the gas venting device is inserted into a hole formed in the battery pack case, which is then coupled through bolt fastening. Further, the gas discharge port portion may be protruded from the battery pack case to thereby form a pipe, and the gas venting device may be inserted into the pipe.

In such a case, a gap is generated between the outer circumference portion of the gas venting device and a hole formed in the battery pack case. As such, the inner gas may be discharged to the outside through the gap. In this case, as the pressure difference between the inside and the outside of the battery pack decreases, the efficiency of the venting device is reduced, and the gas may be discharged when not desired. To solve this, the battery pack may include a sealing member that seals a portion between the battery pack case and the outer periphery of the gas venting device. Specifically, the sealing member may be a rubber ring or a silicone resin and may seal the battery pack by being installed at a gap between the gas venting device and the battery pack case. Namely, in the battery pack according to the present invention, in a state that the inside is sealed, if the internal pressure exceeds a reference value, the venting disk is broken so that the gas inside the battery pack is discharged. At this time, as the cross-sectional area of the flow path gradually decreases in the gas discharge direction, the gas may be discharged at a greater flow rate.

In addition, the present invention may provide a vehicle including the battery pack described above. The vehicle is, for example, an electric vehicle or a hybrid vehicle.

Hereinafter, the present invention will be described in more detail through drawings and the like. However, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

First embodiment

FIG. 1 is a perspective view of a gas venting device according to an embodiment of the present invention, and FIG. 2 is a perspective view showing a coupled form of a bracket and a venting disk in a gas venting device according to an embodiment of the present invention.

Referring to FIGS. 1 and 2, a gas venting device 100 for the battery module and the battery pack according to the present invention includes an inner bracket 110, a venting disk 130, and an outer bracket 120. The inner bracket 110, the venting disk 130, and the outer bracket 120 are coupled to each other through bolts at the outer periphery. A through hole (not shown) is formed in the central portion of the inner bracket 110 so that gas inside the battery pack may flow in. A through hole 121, which is connected to the through hole formed in the inner bracket 110, is formed in the central portion of the outer bracket 120. At this time, a discharge guide member 140 having a gas discharge flow path is inserted into the through hole formed in the central portion of the outer bracket, and the gas discharge flow path is connected to the through hole. A cross-sectional area of the gas discharge flow path continuously or sequentially is configured to decrease from an inlet portion of the flow path to an outlet portion of the flow path. A disk pad (not shown) may be interposed between the outer bracket 120 and the venting disk 130 or between the inner bracket 110 and the venting disk 130. Since a notch 130 is formed in the venting disk 130, the through hole of the inner bracket is shielded in normal conditions, but when a predetermined pressure is applied, the notch portion is broken so that the inner gas is discharged.

Further, since the discharge guide member 140 and the outer bracket 120 are integrally formed, the through hole itself formed in the outer bracket may be used as a discharge flow path. In this case, as described later, the through hole may have a shape in which its cross-sectional area gradually decreases in a gas discharge direction.

FIG. 3 is a schematic diagram showing the shape of a venting disk 130 according to an embodiment of the present invention. Referring to FIG. 3, the venting disk 130 includes a disk outer periphery 131 and a disk inner periphery 132 which is formed with the disk outer periphery 131 as one body. The disk outer periphery 131 has a ring shape corresponding to the outer bracket and the inner bracket and has through holes 133 for bolt fastening at regular intervals. The disk inner periphery 132 of the venting disk 130 has a notch 134 so that the disk inner periphery 132 may be broken by a predetermined pressure. For example, the notch 134 may have a X shape. In this case, even if the disk inner periphery is broken, broken pieces of the disk inner periphery may not completely fall away and may be coupled to the disk outer periphery. If the broken pieces of the disk inner periphery completely fall away from the venting disk, it is difficult to remove them, which may damage other components.

FIG. 4 is a schematic diagram illustrating a cross section of a venting disk and an outer bracket according to an embodiment of the present invention. Referring to FIG. 4, a discharge guide member is inserted into the through hole formed at the central portion of the outer bracket 120, and a gas discharge flow path 141 is formed in the central portion. Herein, the cross-sectional area of the gas discharge flow path 141 gradually decreases from the inlet portion 142 toward the outlet portion 143. In FIG. 4, the gas discharge flow path has a truncated cone shape, the inner wall 144 of the flow path has an inclined surface shape of a truncated cone, and the cross section of the gas discharge flow path has a trapezoidal shape.

In the case that the cross-sectional area of the flow path gradually decreases in the gas discharge direction as described above, the internal pressure increases in the inlet portion 142 having a large cross-sectional area as the speed of the air decreases, and the internal pressure decreases in the outlet portion 143 having a small cross-sectional area as the speed of the air increases. As a result, the pressure difference between the inlet portion 143 and the outlet portion 143 is locally further increased, and even if a venting disk having the same area is used, it is possible to emit gases of a larger flow rate. Therefore, when the internal pressure due to the gas generated in the battery pack exceeds the reference value, the gas is quickly discharged, and the safety of the battery module and the battery pack can be improved.

Second Embodiment

FIG. 5 is a schematic diagram illustrating a cross section of a venting disk and an outer bracket according to another embodiment of the present invention.

Referring to FIG. 5, a discharge guide member 240 is inserted into the through hole of an outer bracket 220, and a gas discharge flow path 241 is formed in the central portion. At this time, the gas discharge flow path 241 has a form in which the cross-sectional area of the gas discharge flow path 241 continuously decreases from an inlet portion 242 toward an outlet portion 243 so that an inclined surface is formed on the inlet portion 244 of the gas discharge flow path 241. At this time, the gas discharge flow path 241 has a truncated cone shape in which the inclined surface is concavely bent. In this case, the cross-sectional area of the flow path gradually decreases in a gas discharge direction, and the pressure difference between the inlet portion and the outlet portion locally further increases, so that even if the same area of venting disk is used, gas can be discharged at a larger flow rate.

Third Embodiment

FIG. 6 is a schematic diagram illustrating a cross section of a venting disk and an outer bracket according to further another embodiment of the present invention.

Referring to FIG. 6, a discharge guide member 340 is inserted into the through hole of an outer bracket 320, and a gas discharge flow path 341 is formed in the central portion. At this time, the gas discharge flow path 341 has a form in which the cross-sectional area of the gas discharge flow path 341 continuously decreases from an inlet portion 342 toward an outlet portion 343 so that an inclined surface is formed on the inlet portion 344 of the gas discharge flow path 341. At this time, the gas discharge flow path 341 has a truncated cone shape in which the inclined surface is convexedly bent. In this case, the cross-sectional area of the flow path gradually decreases in a gas discharge direction, and the pressure difference between the inlet portion and the outlet portion locally further increases, so that even if the same area of venting disk is used, gas can be discharged at a larger flow rate.

The above description is merely illustrative of the technical idea of the present invention, and those skilled in the art to which the present invention pertains may make various modifications and variations without departing from the essential characteristics of the present invention. Therefore, the drawings disclosed in the present invention are not intended to limit the technical idea of the present invention but to describe the present invention, and the scope of the technical idea of the present invention is not limited by these drawings. The scope of protection of the present invention should be interpreted by the following claims, and all technical ideas within the scope equivalent thereto should be construed as being included in the scope of the present invention.

On the other hand, in this specification, terms indicating directions such as up, down, left, right, before, and after are used, but it is obvious that these terms are for convenience of description only and may change depending on the location of the object or the location of the observer.

DESCRIPTION OF REFERENCE NUMERALS

100: gas venting device
110: inner bracket
120, 220, 320: outer bracket
121: through hole
130: venting disk
131: disk outer periphery
132: disk inner periphery
133: hole
134: notch
140, 240, 340: discharge guide member
141, 241, 341: gas discharge flow path
142, 242, 342: inlet portion
143, 243, 343: outlet portion
144, 244, 344: inner wall
150: bolt

The invention claimed is:
1. A gas venting device for a battery module or a battery pack, the gas venting device comprising:

an inner bracket including a first through hole in a central portion through which gas in a battery module or a battery pack flows in;

an outer bracket including a second through hole in a central portion connected to the first through hole of the inner bracket and including an inner wall of a discharge guide member forming a flow path through which inflowing gas is discharged to an outside, the inner wall being convex or concave; and a venting disk configured to shield the first through hole and the second through hole by allowing the inner bracket to be coupled to the outer bracket and to be broken when a predetermined pressure is applied, wherein the flow path has a truncated cone shape in which the cross-sectional area of the flow path continuously decreases toward the outlet portion.

2. The gas venting device of claim 1, wherein the inclined surface formed on the inner wall of the flow path is concave.

3. The gas venting device of claim 1, wherein the inclined surface formed on the inner wall of the flow path is convex.

4. The gas venting device of claim 1, wherein the cross-sectional area of the inlet portion corresponds to the cross-sectional area of the first through hole formed on the inner bracket.

5. The gas venting device of claim 4, wherein the cross-sectional area of the outlet portion corresponds to 40 to 80% of the cross-sectional area of the inlet portion.

6. The gas venting device of claim 1, wherein the venting disk comprises:

a disk outer periphery configured to be coupled to the inner bracket and the outer bracket; and a disk inner periphery configured to be formed as one body with the disk outer periphery and shield the through hole, and be broken when a predetermined pressure is applied.

7. The gas venting device of claim 6, wherein the disk inner periphery is made of a metal or plastic material which is breakable when a predetermined pressure is applied.

8. The gas venting device of claim 6, wherein a notch is formed on the disk inner periphery to be broken when the predetermined pressure is applied.

* * * * *